United States Patent
Talwar et al.

(10) Patent No.: US 10,380,992 B2
(45) Date of Patent: Aug. 13, 2019

(54) NATURAL LANGUAGE GENERATION BASED ON USER SPEECH STYLE

(71) Applicant: GM GLOBAL TECHNOLOGY OPERATIONS LLC, Detroit, MI (US)

(72) Inventors: Gaurav Talwar, Novi, MI (US); Xu Fang Zhao, Lasalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/811,204

(22) Filed: Nov. 13, 2017

(65) Prior Publication Data
US 2019/0147849 A1    May 16, 2019

(51) Int. Cl.
| | | |
|---|---|---|
| G10L 13/02 | (2013.01) | |
| G10L 15/22 | (2006.01) | |
| G10L 15/06 | (2013.01) | |
| G06N 3/02 | (2006.01) | |
| G10L 17/00 | (2013.01) | |
| G06F 3/16 | (2006.01) | |
| G10L 15/18 | (2013.01) | |
| G06N 20/00 | (2019.01) | |

(52) U.S. Cl.
CPC ............... *G10L 13/02* (2013.01); *G06F 3/16* (2013.01); *G06N 3/02* (2013.01); *G06N 20/00* (2019.01); *G10L 15/06* (2013.01); *G10L 15/1807* (2013.01); *G10L 15/22* (2013.01); *G10L 17/005* (2013.01)

(58) Field of Classification Search
CPC ............................. G10L 13/027; G06F 17/2281
See application file for complete search history.

(56) References Cited

U.S. PATENT DOCUMENTS

| | | | | |
|---|---|---|---|---|
| 5,239,594 A | * | 8/1993 | Yoda | G06K 9/6272 382/158 |
| 10,019,491 B1 | * | 7/2018 | Levy | G06F 17/2881 |
| 2010/0114944 A1 | * | 5/2010 | Adler | G10L 13/027 707/770 |

(Continued)

OTHER PUBLICATIONS

Hong, Jin-Hyuk, Sungsoo Lim, and Sung-Bae Cho. "Autonomous language development using dialogue-act templates and genetic programming." IEEE transactions on evolutionary computation 11.2 (2007): 213-225. (Year: 2007).*

(Continued)

*Primary Examiner* — Brian L Albertalli
(74) *Attorney, Agent, or Firm* — Reising Ethington P.C.; David Willoughby

(57) ABSTRACT

A system and method of generating a natural language generation (NLG) output, wherein the method includes: receiving speech signals from a user at a microphone of a client device; determining a requested communication goal and at least one inputted communication value based on the received speech signals; determining to use a static natural language generation (NLG) template or a dynamic NLG template to generate an NLG output, wherein the determination of whether to use a static NLG template or a dynamic NLG template is made using a neural network NLG template selection process; selecting an NLG template after the determination of whether to use a static NLG template or a dynamic NLG template; and generating an NLG output based on the selected NLG template.

20 Claims, 4 Drawing Sheets

(56) References Cited

U.S. PATENT DOCUMENTS

| | | | | |
|---|---|---|---|---|
| 2010/0153105 | A1* | 6/2010 | Di Fabbrizio | G06F 17/279 704/235 |
| 2013/0174026 | A1* | 7/2013 | Locke | G06Q 10/10 715/254 |
| 2014/0136187 | A1* | 5/2014 | Wolverton | G06F 17/30654 704/9 |
| 2014/0317030 | A1* | 10/2014 | Shen | G06N 3/006 706/12 |
| 2015/0310849 | A1* | 10/2015 | Onishi | G10L 13/027 704/258 |
| 2015/0332665 | A1* | 11/2015 | Mishra | G10L 15/1815 704/257 |
| 2018/0129651 | A1* | 5/2018 | Latvala | G06F 17/28 |
| 2018/0233133 | A1* | 8/2018 | Hilal | G10L 15/1822 |

OTHER PUBLICATIONS

Al-Alwani, Abdulkareem. "A novel email response algorithm for email management systems." Journal of Computer Science 10.4 (2014): 689. (Year: 2014).*

* cited by examiner

US 10,380,992 B2

NATURAL LANGUAGE GENERATION BASED ON USER SPEECH STYLE

INTRODUCTION

The present invention relates to generating natural language generation (NLG) outputs based on characteristics or style of a user's speech.

A variety of device functions may be controlled on a client device using automatic speech recognition (ASR). For example, vehicles include hardware and software capable of receiving speech from a vehicle occupant, processing that speech to understand speech content, and then carrying out some action based on the speech content. The vehicles or other client devices can use the hardware and software to process received speech at the vehicle. A response to an ASR input may be generated at the vehicle or client device.

SUMMARY

According to one aspect of the invention, there is provided a method of generating a natural language generation (NLG) output, wherein the method includes: receiving speech signals from a user at a microphone of a client device; determining a requested communication goal and at least one inputted communication value based on the received speech signals; determining to use a static natural language generation (NLG) template or a dynamic NLG template to generate an NLG output, wherein the determination of whether to use a static NLG template or a dynamic NLG template is made using a neural network NLG template selection process; selecting an NLG template after the determination of whether to use a static NLG template or a dynamic NLG template; and generating an NLG output based on the selected NLG template.

According to various embodiments, this method may further include any one of the following features or any technically-feasible combination of these features:

- the step of identifying a user or a likely user that transmitted the speech signals;
- the neural network NLG template selection process is carried out based on a history of the identified user or likely user and/or a profile of the identified user or likely user;
- the selected NLG template is selected based on the history of the identified user or likely user and/or the profile of the identified user or likely user;
- the step of identifying a style based on the received speech signals, the history of the identified user or likely user, and/or the profile of the identified user or likely user, and wherein the identified style is used in the neural network NLG template selection process;
- the step of, when it is determined that a dynamic NLG template is to be used to generate the NLG output, then generating the dynamic NLG template using an NLG template generation process;
- the dynamic NLG template is generated based on the communication goal and one or more obtained communication values;
- the step of identifying a user or a likely user that transmitted the speech signals, wherein the dynamic NLG template is generated based on user information that is associated with the user or likely user, and wherein the user information includes either or both of user history information or user profile information;
- the NLG template generation process is a rule-based NLG template generation process;
- the NLG template generation process is a neural network NLG template generation process;
- the steps of: sending a communication value request to a remote server, wherein the communication value request is a request to obtain responsive communication values that are to be used in the NLG output and that are based on the communication goal and inputted communication values; and receiving a communication value response from the remote server, wherein the communication value response includes responsive communication values that are to be used in generating the NLG output;
- the step of adapting the neural network NLG template selection process based on previous iterations of the neural network NLG template selection process; and/or
- the adapting step further comprises adapting the neural network NLG template selection process based on a set of inputs, the NLG output, and a measured success of the neural network NLG template selection process, wherein the set of inputs includes the communication goal, the inputted communication values, and information pertaining to a user or a likely user that transmitted the speech signals.

According to another aspect of the invention, there is provided a method of generating a natural language generation (NLG) output, wherein the method includes: receiving speech signals from a user at a microphone of a client device; identifying a user or a likely user that transmitted the speech signals; determining a communication goal and at least one inputted communication value based on the received speech signals; determining whether to use a static NLG template or dynamic NLG template for use in generating an NLG output, wherein the determination of whether to use a static NLG template or dynamic NLG template is made using a neural network NLG template selection process, wherein the neural network NLG template selection process uses an artificial neural network to resolve a set of inputs to select whether to use a static NLG template or dynamic NLG template for use in generating an NLG output, and wherein the set of inputs include the communication goal, the inputted communication values, and either a user history that is associated with the user or a user profile that is associated with the user; where it is determined to use a static NLG template, then selecting a static NLG template; when it is determined to use a dynamic NLG template, then generating the dynamic NLG template; and generating the NLG output using the selected NLG template.

According to various embodiments, this method may further include any one of the following features or any technically-feasible combination of these features:

- the set of inputs includes both the user history that is associated with the user and the user profile that is associated with the user;
- the neural network NLG template selection process includes a set of potential outputs that include a first NLG template output value and a second NLG template output value, wherein the first NLG template output value corresponds to a probability that a static NLG template will be used in generating the NLG output, and wherein the second NLG template output value corresponds to a probability that a dynamic NLG template will be used in generating the NLG output;
- the identifying step includes using the received speech signals to identify the user and wherein it is determined to use a static NLG template or a dynamic NLG template based on an identified style, emotion, and/or dialect of the received speech signals;

the dynamic NLG template is generated and/or the static NLG template is selected based on the identified style, emotion, and/or dialect of the received speech signals;

the dynamic NLG template is generated using a machine learning NLG template generation process, and wherein the machine learning NLG template generation process uses a different machine learning technique than that which is used in the neural network NLG template selection process; and/or the different machine learning technique is a rule-based approach that includes a predefined set of rules that are followed in generating the dynamic NLG template.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
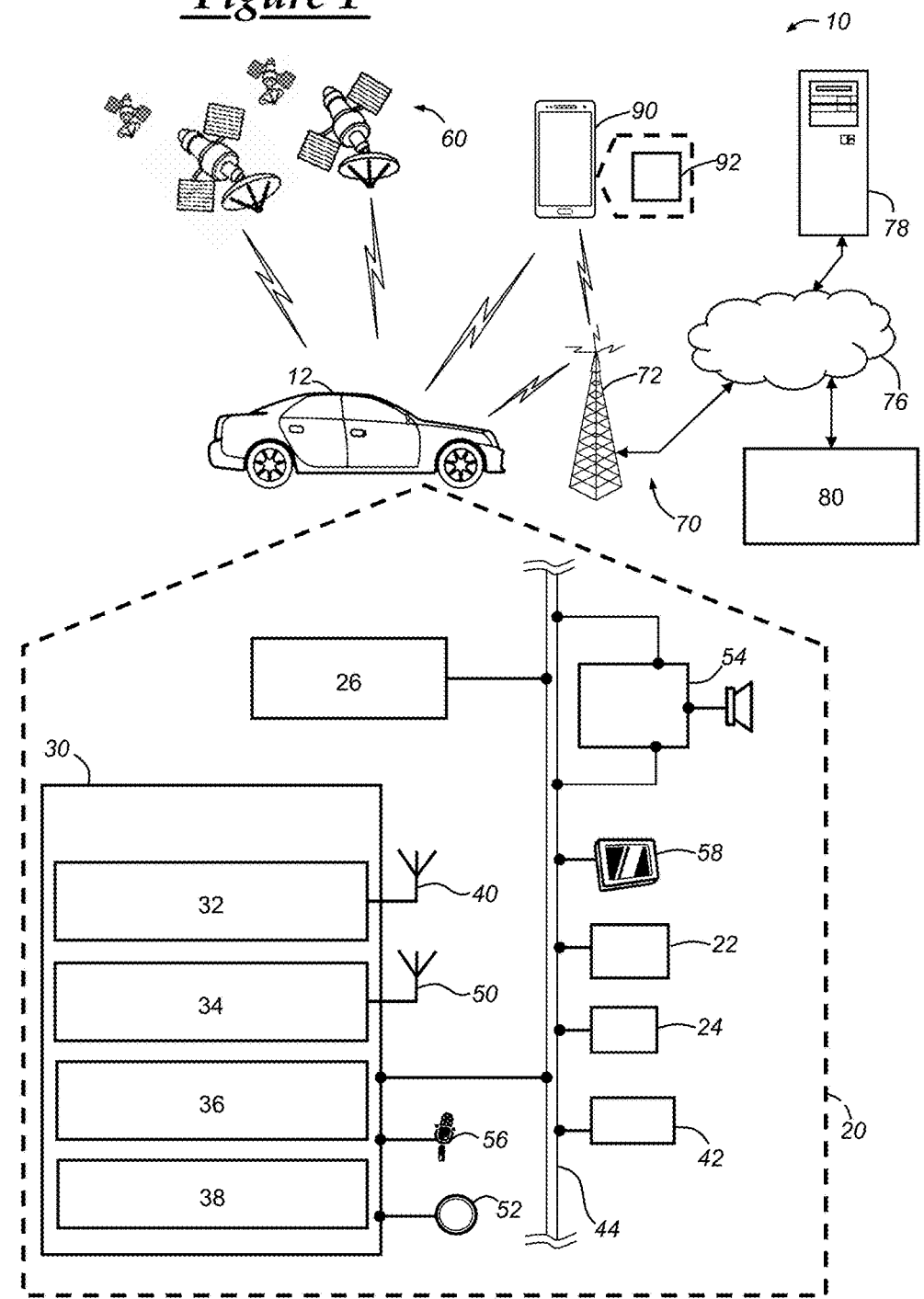
FIG. 1 is a block diagram depicting an embodiment of a communications system that is capable of utilizing the method disclosed herein.

The system and method described below provide for generating natural language generation (NLG) outputs using a machine learning NLG process that can, at least in some embodiments, select between using a static (or predefined) NLG template and using a dynamic NLG template. The NLG template can be selected such that the selected NLG template is tailored to a particular user, a particular ASR input, and/or combination thereof. Natural language generation (NLG) refers to the process of generating a natural language output that conveys a statement, inquiry or question, and/or other intent from a machine to a user. In many instances, NLG templates are used for generating an NLG output. A machine learning NLG template selection process can be carried out as part of the machine learning NLG process. The NLG template selection process is the process of selecting to use a static or dynamic NLG template using machine learning techniques. The NLG template can be selected based on certain user information, a communication goal or intent, and/or various other information, as discussed below.

As used herein, an "NLG template" is a collection of prefabricated or predefined phrases, sentences, and/or statements that include one or more input fields in which a particular value or word can be placed based on the desired or intended output. Also, as used herein, an "NLG output" is any output that is based on a natural language and that, at least in some instances, can be audibly transmitted using a speaker (i.e., an audible NLG output) or presented in a visual manner such as presenting a textual representation that includes text characters (e.g., alphanumeric characters). And, as used herein, a machine learning NLG process is the process of using machine learning techniques to select an NLG template, generate an NLG template, and/or generate an NLG output and, thus, at least in some embodiments, may include the machine learning NLG template selection process. When a neural network model is used, the NLG process may be referred to as a neural network NLG process (and the same is true for the machine learning NLG sub-processes).

As will be discussed more below, the machine learning NLG process can include various processes (or "sub-processes"), including an NLG template selection process, an NLG template generation process, and/or an NLG output generation process. The NLG template selection process is the process of selecting an NLG template to use in generating the NLG output, which can include selecting between a static and a dynamic template based on a communication goal, a style of received speech, a user profile, user history, and/or various other factors. The NLG generation process can be carried out when a dynamic template is determined to be used for generating the NLG output. The NLG output generation process is the process for generating the NLG output using the selected and/or generated NLG template.

In some scenarios, the NLG template selection process may determine to use a static NLG template, which is an NLG template that is predefined such that certain communication goals are mapped to predefined NLG templated outputs. And, in other embodiments, the NLG template selection process may determine to use a dynamic NLG template, which is an NLG template that is at least partly generated using the machine learning NLG template generation process at a time after the NLG template selection process and, at least in some embodiments, can be based on deriving certain templated outputs from various predefined or static NLG templates. When a static NLG template is selected, the NLG output generation process (i.e., the process of using NLG template(s) to generate an NLG output) may immediately be carried out. When it is determined that a dynamic NLG template is to be used in the NLG output generation process, then a NLG template generation process can be used to generate the dynamic NLG template. The dynamic NLG template can be generated based on a communication goal that is identified from received speech signals, a style (or other attributes) of the received speech signals, an emotion of the received speech signals, a persona of the received speech, and/or based on a user profile or history. This allows a dynamic NLG template to be generated that can be suited to match the style of communication so as to improve user experience.

For example, the dynamic NLG template can be tailored to a particular user and/or may be generated, updated, or modified based on ASR input from a given user. And, in certain embodiments, when the same communication goal and the same or similar style or emotion is repeatedly used by a user for querying the ASR system, then a dynamic NLG template can be saved to expedite future NLG processes. For example, instead of generating the same dynamic NLG template, the dynamic NLG template can be saved and, later, can be recalled from memory when it is determined to be used thereby avoiding having the regenerate the dynamic NLG template. It should be appreciated that when the dynamic NLG template is saved in such a manner that it becomes a static NLG template. Moreover, the machine learning NLG process (and sub-processes) can use a variety of machine learning techniques, including artificial neural networks, to select between NLG templates and/or to update or modify NLG templates.

In one embodiment, a neural network natural language generation (NLG) template selection process can be used to select an NLG template based on a style (or emotion) of received speech signals and a communication goal that is identified based on the received speech signals. In one scenario, a first user may talk in a wordy and drawn out manner and, thus, a neural network NLG template selection process may be used to select a verbose NLG template that, when used for NLG, results in a wordy or drawn out response. For example, when a user or a user's speech is recognized as loquacious or verbose, an NLG template may be used to generate an NLG output that results in a loquacious or verbose output; in one instance, when a user says: "Hello ASR system, please tell me the weather of my current location," the system may respond: "Hello User 1, the weather today is cloudy with a high of 43 degrees Fahrenheit and a low of 31 degrees Fahrenheit." In another scenario, a second user may use very few words and, therefore, an NLG template that is tailored to be more direct and to the point can be selected by the neural network NLG template selection process. Here, an NLG template may be selected that produces the following output: "Cloudy, high of 43, low of 31." The neural network NLG template selection process can select a static template based on the style or emotion of the user's speech or may select to use a dynamic NLG template. In the latter case, an NLG template generation process can be carried out to generate a dynamic NLG template based on the style or emotion of the user's speech.

With continued reference to the previous two examples, the first NLG template (the verbose NLG template) used a templated sentence that was tailored to providing weather information: "the weather today is <weather_condition> with a high of <high_temp> degrees Fahrenheit and a low of <low_temp> degrees Fahrenheit." The second NLG template (the direct NLG template) used a templated phrase that was also tailored to providing weather information: "<weather_condition>, high of <high_temp>, low of <low_temp>." Here, "<weather_condition>" is a placeholder or input field for the overall weather condition, such as cloudy, sunny, partly cloudy, etc., "<high_temp>" is the high temperature for the day and "<low_temp>" is the low temperature for the day. In addition, the first user said "Hello ASR system," and, thus, the machine learning NLG process using the first NLG template appended a "hello" statement onto the beginning of the NLG output so as to match the ASR input. The placeholders or input fields can reserve a spot within the phrase or sentence in which a responsive communication value may be inserted. For example, the responsive communication value for low_temp can be "31" and, using either template, the response communication value can be inserted into the input field. In one embodiment, the first template may be a static template that is configured to be used for use when the communication goal is providing local weather and when the user or the user's speech is verbose. In another embodiment, the NLG process may determine that there is not an appropriate static template to use in responding to the first user and, thus, a dynamic template can be developed based on the verbose nature of the received speech signals from the first user and/or on other information, such as the communication goal.

The machine learning NLG process including the subprocesses discussed above can be implemented into a computer-executable application that can be executed on a variety of different client devices, including handheld mobile devices (e.g., smartphones), home automation devices (e.g., intelligent personal assistants such as Amazon™ Alexa™ and Google™ Home), vehicles, and/or any device that can receive speech, connect to a remote computer network, and be configured to implement the machine learning NLG process or application discussed herein. In a particular embodiment, a vehicle can be used as a client device to receive and perform the machine learning NLG process. In other embodiments, the machine learning NLG process can be performed at a remote facility, which may have access to more resources (e.g., more data) and/or may have higher processing capabilities. The machine learning NLG process, including the machine learning NLG template selection process, can be based on numerous inputs, including user history, a user profile, a communication goal, and a communication value.

With reference to FIG. 1, there is shown an operating environment that comprises a communications system 10 and that can be used to implement the method disclosed herein. Communications system 10 generally includes a vehicle 12 with a body control module (BCM) 26 and a wireless communications device 30, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN)

such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be a client device that can perform speech processing and/or at least part of the machine learning NLG process. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions through use of one or more electronic servers. For example, remote facility 80 may be used in part to facilitate or coordinate information sent between vehicle 12 and one or more client devices, such as mobile device 90 or computer 78. In one embodiment, the remote facility 80 can provide speech recognition services, which can include receiving speech signals from a client device and processing the received speech signals using a speech recognition system. Additionally, or alternatively, the remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76.

Remote facility 80 can also include one or more databases that can store account information such as subscriber authentication information, vehicle identifiers, profile records, behavioral patterns, speech recognition and/or NLG information (including NLG templates in an NLG template database), and other pertinent subscriber information. As used herein, speech recognition and/or NLG information includes information that can be used for training a speech recognition or NLG system, such as the machine learning NLG process discussed in detail below. In some embodiments, the remote facility 80 can perform one or more steps of the NLG process and/or may supplement the NLG process by, for example, providing useful information to the client device that is performing the NLG process. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal mobile device 90 is a mobile device and may include: hardware, software, and/or firmware enabling cellular telecommunications and short-range wireless communications (SRWC) as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. Personal mobile device 90 can be a client device and can include a processor and memory (e.g., non-transitory computer readable medium configured to operate with the processor) for storing the software, firmware, etc. The personal mobile device's processor and memory may enable various software applications 92, which may be preinstalled or installed by the user (or manufacturer) (e.g., having a software application or graphical user interface (GUI)).

One implementation of a mobile device application 92 may enable receiving speech and processing the received speech using speech recognition techniques, some of which may include generating a natural language generation (NLG) response. In some embodiments, the mobile device 90 can be a client device that carries out the machine learning NLG process. For example, the mobile device 90 can include a microphone that enables the reception of speech waves that are generated by one or more users. In a particular embodiment, NLG template selection can be carried out at the mobile device according to the neural network NLG process discussed below. In some embodiments, application 92 or another mobile device application can include a graphical user interface (GUI) that allows a user to enter credentials, submit credentials for authorization and/or authentication, connect to vehicle 12, view vehicle status information, request vehicle functions to be carried out, and/or configure one or more vehicle settings. Mobile device 90 may communicate with wireless communications device 30 according to one or more SRWC technologies or wired connections, such as a connection using a Universal Serial Bus (USB) cable. Although a single mobile device 90 is shown, communications 10 can include a plurality of mobile devices 90.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, engine control unit (ECU) 24, a body control module (BCM) 26, a wireless communications device 30 that can be configured to perform a machine learning NLG process and/or speech recognition processing, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, ECU 24, BCM 26, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 can be connected to the other VSMs via communications bus 44, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data (e.g., geographical coordinates) to wireless communications device 30, which can then use this data to identify known locations, such as a vehicle operator's home or workplace. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The location information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70, and which can be processed using speech recognition techniques, as discussed more below. Microphone 56 can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. BCM 26 can include a processor and/or memory, which can be similar to processor 36 and memory 38 of wireless communications device 30, as discussed below. BCM 26 may communicate with wireless communications device 30 and/or one or more vehicle system modules, such as GNSS 22, audio system 54, or other VSMs 42. The processor and memory of BCM 36 can be used to direct or carry out one or more vehicle operations including, for example, controlling central locking, air conditioning, power mirrors, controlling the vehicle ignition or primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. The BCM 26 may be used to determine one or more vehicle states, such as whether the vehicle is powered on, the battery power of a vehicle battery, and/or other vehicle states. These various vehicle states can be obtained wireless communications device 30 and used as an input in the machine learning NLG process. For example, the vehicle can recognize certain mobile devices 90 that are present within or near the vehicle and, based on previous user settings or configurations, the vehicle may determine that the presence of a particular mobile device indicates a high probability that a particular user is near or at the vehicle. This indication can be used in identifying the particular user such that an NLG template can be generated, selected, and/or used by the vehicle to generate an NLG output.

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, a processor 36, memory 38, and antennas 40 and 50. In some embodiments, the wireless communications device 30 may be specifically configured to carry out at least part of the method disclosed herein. In one embodiment, wireless communications device 30 may be a stand-alone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth™ Low Energy (BLE), or near field communication (NFC). As used herein, Bluetooth™0 refers to any of the Bluetooth™ technologies, such as Bluetooth Low Energy™0 (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70.

Wireless communications device 30 may enable vehicle 12 to be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. It should be appreciated that mobile device 90 can include a cellular chipset and/or other communicating means that can be used for packet-switched data communications.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, at least in one embodiment, processor 36 can execute programs or process data to carry out at least a part of the method discussed herein, which can include performing NLG template selection and/or generation using a neural network model. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

Figure 2:
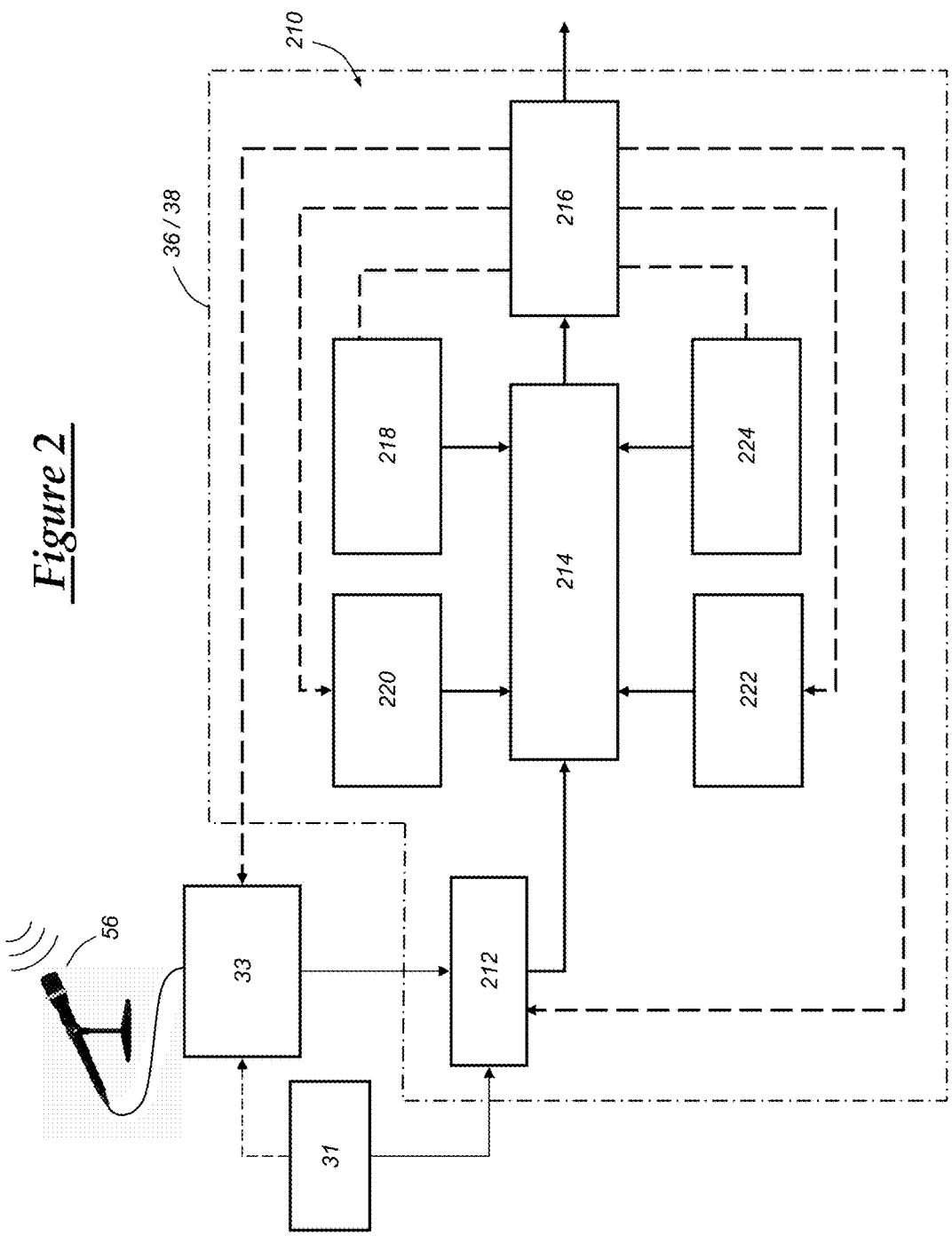
FIG. 2 is a block diagram depicting an embodiment of an automatic speech recognition (ASR) system.

Turning now to FIG. 2, there is shown an illustrative architecture for an ASR system 210 that can be used to enable the presently disclosed method. Although the ASR system 210 is discussed below with respect to wireless communications device 30 of vehicle 12, the ASR system 210 can be incorporated into any client device, such as those discussed above including mobile device 90 and computers 78. An ASR system that is similar or the same to ASR system 210 can be incorporated into one or more remote speech processing servers, including one or more servers located at remote facility 80. In general, a vehicle occupant vocally interacts with an automatic speech recognition (ASR) system for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like. Additionally, at least in some embodiments, the ASR system can be used to carry out at least part of the machine learning NLG process including selecting an NLG template and/or generating an NLG output based on a selected NLG template.

ASR systems are generally known to those skilled in the art, and FIG. 2 illustrates just one specific illustrative ASR system 210. The system 210 includes a device to receive speech such as the vehicle microphone 56, and an acoustic interface 33 such as a sound card of the wireless communications device 30 having an analog to digital converter to digitize the speech into acoustic data. The system 210 also includes a memory such as the vehicle memory 38 for storing the acoustic data and storing speech recognition software and databases, and a processor such as the vehicle processor 36 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 276 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic services of any kind.

One or more modules or models can be used as input to the decoder module(s) 214. First, grammar and/or lexicon model(s) 278 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 278 can include all commands known to and used by the system 210. In another example, if the system 210 is in a main menu mode, then the active grammar model(s) 278 can include all main menu commands expected by the system 210 such as call, dial, exit, delete, directory, or the like. Second, acoustic model(s) 280 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12, such as the computer 78 or the remote facility 80. For example, grammar models, acoustic models, and the like can be stored in memory of one of the servers and/or databases in the remote facility 80 and communicated to the vehicle wireless communications device 30 for in-vehicle speech processing. Similarly, speech recognition software can be processed using processors of one of the remote servers in the remote facility 80. In other words, the ASR system 210 can be resident in the wireless communications device 30, distributed across the computer 78/remote facility 80 and the vehicle 12 in any desired manner, and/or resident at the computer 78 or remote facility 80.

First, acoustic data is extracted from human speech wherein a vehicle occupant speaks into the microphone 56, which converts the utterances into electrical signals and communicates such signals to the acoustic interface 33. A sound-responsive element in the microphone 56 captures the occupant's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the memory 38 of wireless communications device 30 and then processed by the processor 36 of wireless communications device 30 or can be processed as they are initially received by the processor 36 in real-time.

Second, the pre-processor module(s) 212 transforms the continuous stream of digital speech data into discrete sequences of acoustic parameters. More specifically, the processor 36 executes the pre-processor module(s) 212 to segment the digital speech data into overlapping phonetic or acoustic frames of, for example, 10-30 millisecond (ms) duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

MINI engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an MINI engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest.

In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 276 receives the output data from the decoder module(s) 214 for any suitable purpose. In one example, the post-processor software module(s) 276 can identify or select one of the reference patterns from the N-best list of single or multiple word reference patterns as recognized speech. In another example, the post-processor module(s) 276 can be used to convert acoustic data into text or digits for use with other aspects of the ASR system or other vehicle systems. In a further example, the post-processor module(s) 276 can be used to provide training feedback to the decoder 214 or pre-processor 212. More specifically, the post-processor 276 can be used to train acoustic models for the decoder module(s) 214, or to train adaptation parameters for the pre-processor module(s) 212.

At least in some embodiments, the ASR system can also be incorporated with a natural language generation (NLG) system that can carry out the machine learning NLG process discussed herein. In other embodiments, the machine learning NLG process can be a part of a separate module and/or may be executed using different components or systems. Also, the NLG process may be carried out at different locations and/or using different components. In one embodiment, the vehicle or other client device can be used to carry out the entire NLG process or, in another embodiment, a remote server or facility can be used to carry out the entire NLG process. In other embodiments, a combination of the client device and the remote server or facility can be used for carrying out the NLG process. For example, the selecting of an NLG template may be carried out at a remote facility 80, while the generation of an NLG template and/or generation of the NLG output using the NLG template may be carried out at the vehicle or other client device. Various other embodiments exist, as will be appreciated by those skilled in the art in light of the discussion below.

And, as will also be evident from the discussion below, the ASR system and/or machine learning NLG application can be included in a client device, such as vehicle 12 or mobile device 90, and/or included in a server device, such as a server located at remote facility 80. At least according to some embodiments, the ASR system located at the remote server can include more processing power, as well as more speech recognition information that can be used to provide a more powerful ASR system than that which is located at the client device; however, as those skilled in the art will appreciate, other embodiments exist.

The machine learning NLG process or parts thereof can be implemented in a computer program product (or "application") embodied in a computer readable medium and including instructions usable by one or more processors of one or more computers of one or more systems. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method. Additionally, the ASR system or parts thereof can be embodied in a computer program product, similar to the computer program product that may embody the machine learning NLG process.

Figure 3:
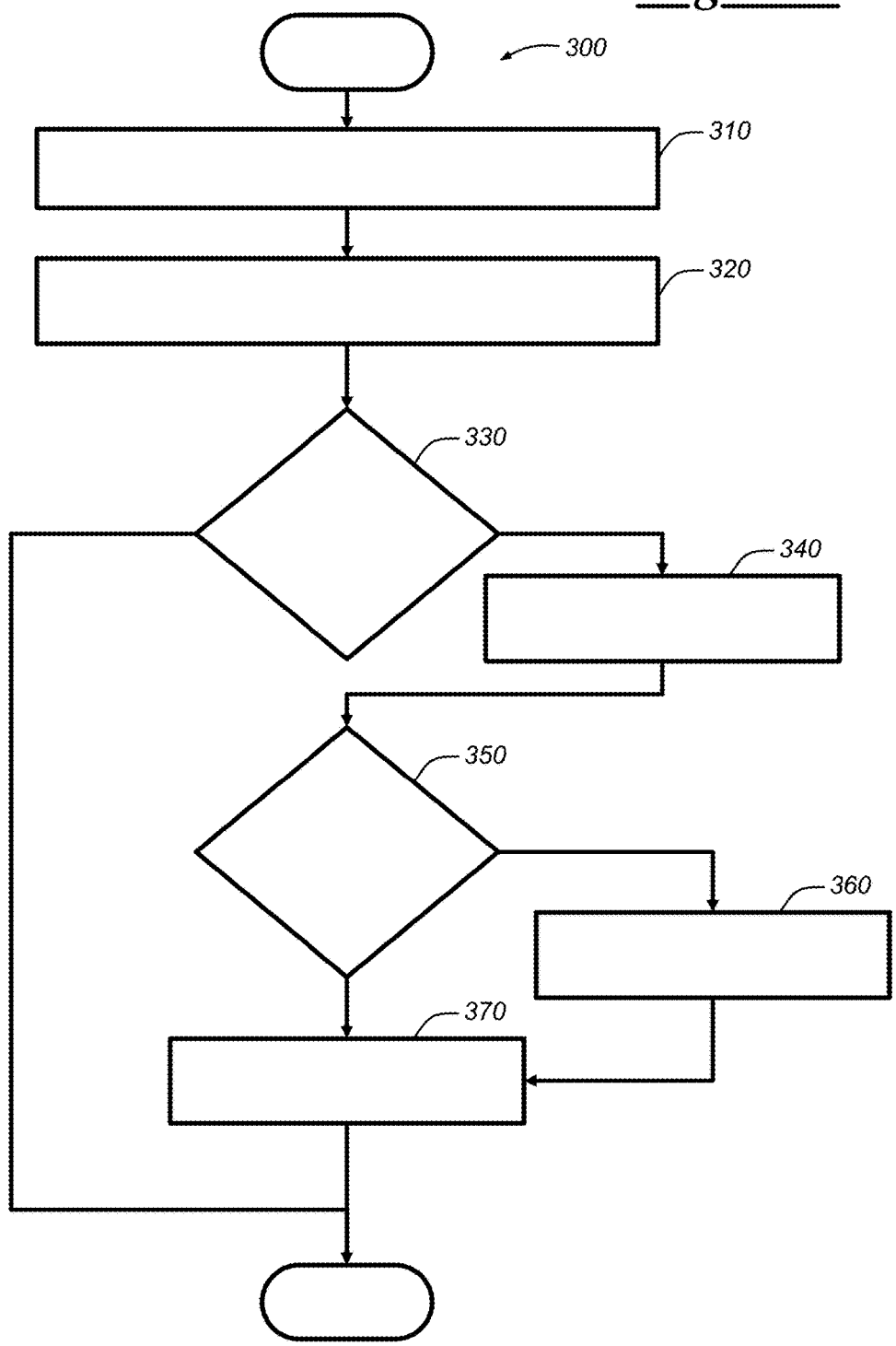
FIG. 3 is a flow chart of an embodiment of a method of generating a natural language generation (NLG) output.

Turning now to FIG. 3, there is shown an embodiment of a method 300 of generating a natural language generation (NLG) output. The method 300 generally can be used to receive speech signals, determine whether to use a static NLG template or a dynamic NLG template using a machine learning NLG template selection process, and generate the NLG output using a selected NLG template. The machine learning NLG template selection process may result in determining to use a dynamic template and, in such a case, an NLG template generation process can be carried out to create the dynamic NLG template. Then, after an NLG template is selected and/or generated if necessary, the NLG output can be generated using the selected NLG template, which, at least in some embodiments. With respect to the particular embodiment of method 300, a neural network NLG process is discussed, which is a machine learning NLG process that uses artificial neural networks to carry out NLG template selection process, NLG template generation process, and/or NLG output generation process. Those skilled in the art will appreciate that other machine learning techniques can be used to carry out the machine learning NLG process, including decision tree learning, association rule learning, deep learning, inductive logic programming, clustering, Bayesian networks, and various others.

The machine learning NLG process can be implemented on processor 36 of wireless communications device 30 in vehicle 12 and/or may be implemented on another VSM of vehicle 12. The machine learning NLG process may be implemented on wireless communications device 30 (or other VSM) by configuring the device 30 with a machine learning NLG application, which may be in the form of software and/or firmware instructions or a part of a computer program product. The machine learning NLG application can be initially configured and/or compiled at a remote facility, such as remote facility 80, and may be installed on the wireless device 30 (or other client device) via use of a provisioning process or initial manufacture process that can be carried out before, during, or after sale of vehicle 12 (or other client device). In some embodiments, the machine learning NLG template selection process can be implemented at a remote facility and a machine learning NLG output generation process can be implemented at a client device; however, this is but one example, as those skilled in the art will recognize various other implementations in light of the discussion below.

At least in one embodiment, the machine learning NLG application may initially include a set of computer instructions and a set of initial NLG information such as NLG template information, including a plurality of predefined or static NLG templates. The machine learning NLG template selection process can be implemented on a client device in the form of a computer application and, thus, may be referred to as a machine learning NLG template selection application. Additionally, a dynamic NLG template can be generated for a particular user and, based on received speech signals from that user and/or based on a user profile, the dynamic NLG template can be updated to better reflect an NLG template tailored to the particular user. When a new user is first identified by the client device or communications system, a predefined template may be selected based on user settings. During subsequent machine learning NLG process iterations, the NLG template selection process can select a template for the user based on the user's profile and/or the user's history, which can be saved during ASR processes, including NLG processes. A static NLG template or a dynamic NLG can be selected using the user's history and, when a dynamic NLG template is selected, a dynamic NLG template can be generated based on the use's history, the user's profile and settings, the received speech signals, and the communication goal. The user's history can include information regarding previous machine learning NLG process iterations (including input, output, and performance metrics associated with the machine learning NLG process iterations), previously received speech signals, and analysis of previously used speech signals, including the style, emotion, dialect, and/or character of the speech. The user's profile can include one or more styles of speech signals previously transmitted by the user, one or more styles selected by a user, or other information pertaining to the user's speech. In one embodiment, the user's profile can include a typical speech style that the user tends to talk with more than others. For example, a first user may talk verbosely and, thus, the user profile can include an indication of this.

Additionally, various NLG templates can be designed and/or predefined for different types of users, including: a verbose NLG template that uses full sentences and/or more wordy phrases; a direct NLG template that uses phrases and/or a reduced amount of words; a formal NLG template that includes predefined statements or phrases using formal language; an informal NLG template that includes predefined statements or phrases using informal or casual language; a clear-spoken NLG template that produces NLG audio output that is designed to be very clear so that, for example, a person with damaged or below average hearing or understanding can more likely interpret the NLG output; and/or a hip NLG template that uses popular verbiage. One of these predefined templates may be selected for use as a starting point for a new user. The user may configure their user profile and/or settings to select a starting template or the system may automatically select a template that it determines will best suit the user.

The machine learning NLG application can be generated and/or initially trained using various training information, including information gathered from previous iterations of the machine learning NLG processes. In some embodiments, a neural network NLG application can be trained using various statistical algorithms. The machine learning NLG application can be periodically updated and/or trained so as to improve the generation of NLG outputs. This can include using inputs and outputs of previous NLG process iterations (as well as performance indicators) as training information for the machine learning NLG process. Additionally, other training information (e.g., sets of inputs and their corresponding or desired outputs), as well as updated software/firmware instructions can be sent to the client device from a remote server, such as remote facility 80. In one embodiment, the machine learning NLG template selection process may select static NLG templates until the machine learning NLG process is sufficiently trained such that dynamic templates can be generated that accurately reflect a style or type of response that corresponds to the received speech signals or the user's profile/history.

The training of the machine learning NLG process or application can be carried out before the machine learning NLG application is installed on the client device and/or before the machine learning NLG application is configured for use in the client device. Moreover, the initial training can supervised training that uses training information (inputs, outputs, and accuracy of outputs) that was obtained from previous NLG models. In other embodiments, the initial training can be unsupervised training. The initial training can be carried out at a remote facility, such as remote facility 80, and, when the initial training is complete and the client device is ready to be configured for use, the machine learning NLG application can be installed. The machine learning NLG application can be included as a part or module of a speech recognition application and may be carried out and/or integrated in a similar manner as the ASR system discussed above.

In embodiments that use neural networks for the machine learning NLG process, a shallow neural network or a deep neural network can be used for the neural network NLG process. As used herein, a shallow neural network includes a single hidden layer whereas a deep neural network includes a plurality of hidden layers. Each layer of the neural network may include one or more nodes, each of which may map to one or more other nodes within the same hidden layer, to one or more other nodes within another hidden layer, or to one or more output nodes.

Figure 4:
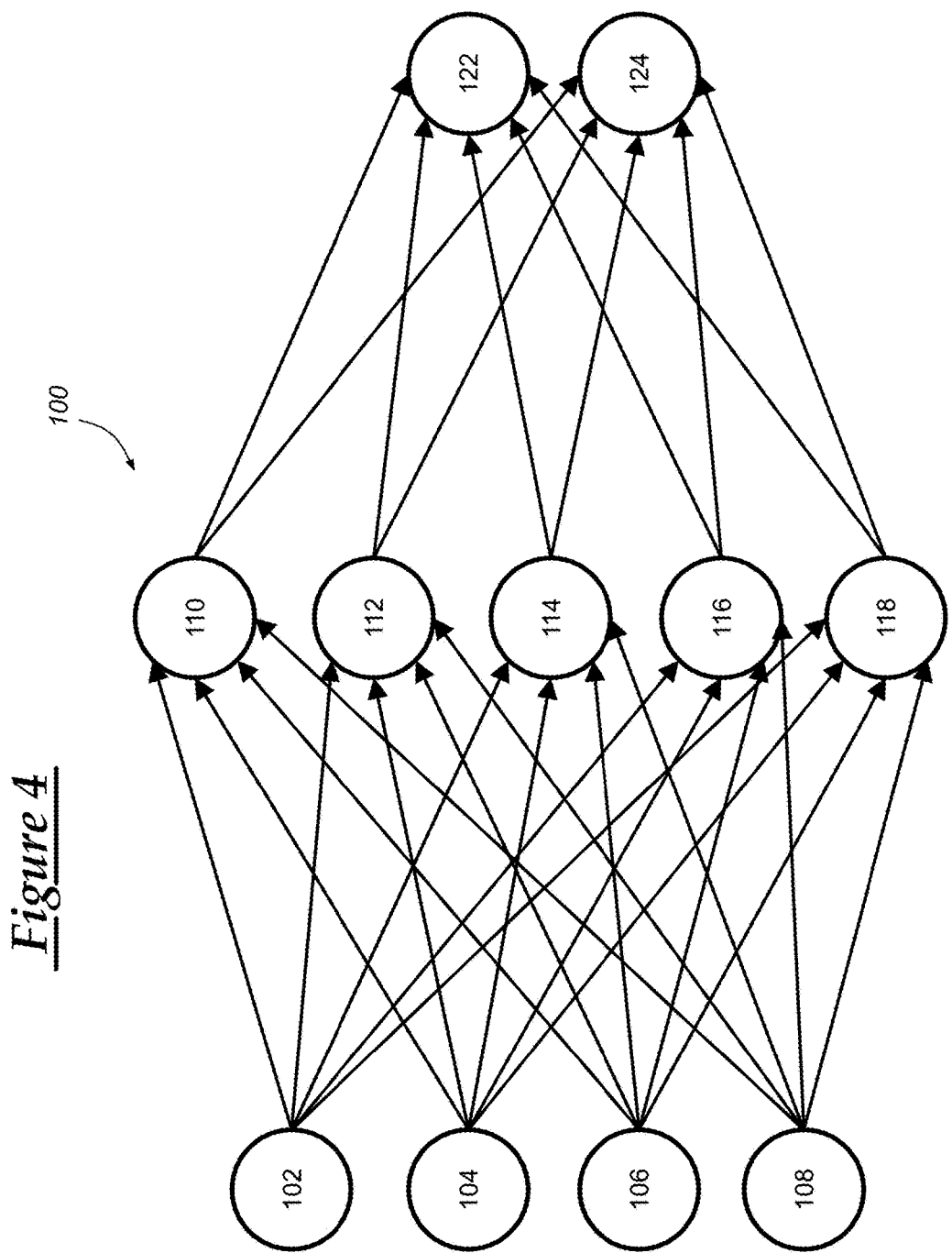
FIG. 4 is a block diagram depicting an embodiment of a neural network model that can be used in a machine learning NLG process or application.

For example, FIG. 4 depicts an example neural network model that can be used in the neural network NLG template selection process or application. The neural network model 100 includes a set of input nodes 102-108, neural network (or machine learning) output nodes 122-124, and a hidden layer that includes nodes 110-118. The set of input nodes 102-108 can each correspond to a different input, including a communication goal (102), a communication value (104), a user profile (106), and user history (108). The hidden layer, including nodes 110-118, can be used to map the inputs to the appropriate output. The neural network NLG template selection nodes 122-124 can correspond to an NLG template, such as a static or predefined NLG template or a dynamic NLG template. In one embodiment, the outputs 122 and 124 can each be associated with a probability or statistical measure that indicates a posterior probability for using the static NLG template (output 122) and a posterior probability for using the dynamic NLG template (output 124). The template generation selection process can select the template with the highest probability. Various statistical models can be used within the machine learning NLG template selection process. Additionally, although the neural network model 100 is discussed with reference to the neural network NLG template selection process, a neural network model could also be used for the other processes, including the neural network NLG template generation process and the neural network NLG output generation process.

Method 300 begins with step 310, wherein speech signals are received at the client device. As mentioned above, the client device may be one of a variety of devices, including vehicle 12, mobile device 90, and/or computer 78; however, the method 300 is discussed using vehicle 12 as the client device. Vehicle 12 can receive the speech signals using microphone 56 at wireless communications device 30. The speech signals can be sampled so that a digital representation of the speech signals can be obtained and used by the processor 36. The sampling can be carried out at the microphone 56, at the wireless communications device 30, or at another VSM of vehicle 12. Once the speech signals have been received and sampled, method 300 continues to step 320.

In step 320, a user or a likely user that transmitted the speech signals is identified. In one embodiment, the received speech signals are processed along in light of the history of various users and, based on the processing, a particular user may be identified as transmitting the speech. Or, the system may determine a probability that a particular user transmitted the speech signals and, when the probability is above a particular threshold or higher than all of the other probabilities with respect to other users, then the system can determine that a user is likely to have transmitted the speech signals. These probabilities can be based on a user's history and/or profile, which can include information pertaining to a user's previously speech signals. In a particular embodiment, a fingerprint for a particular user's voice may be generated and used to identify a particular user.

Alternatively, or additionally, a state of the client device, such as the vehicle, can be used to determine a user or likely user that transmitted the speech signals. In one scenario, the client device may be a smartphone that belongs to a single user and, thus, the system may be predisposed to determining that the user or likely user is the single user of the smartphone and therefore transmitted the speech signals. In another embodiment, a vehicle may determine which users are present at the vehicle through, for example, determining which key was used to start the vehicle, which seats of the vehicle are occupied, and/or which personal mobile devices are located in or near the vehicle. Other various vehicle states can be used as well. Once a particular user is identified, the method 300 continues to step 330.

In step 330, a communication goal is determined based on the received speech signals. As used herein, a communication goal represents an intent that is trying to be communicated to the ASR system using the received speech signals. The intent can be determined through use of the ASR system 210, as discussed above. This can include performing various speech recognition techniques and, then, using post-processing techniques to determine an intent that is sought to be communicated by the user. These post-processing techniques can include using natural language understanding (NLU) processing techniques or a dialogue manager that can interpret the received speech signals. Once the communication goal is determined by the NLU system or the dialog manager, the communication goal can be saved and associated with the identified user.

In some embodiments, communication values can be obtained from the received speech. These communication values that are obtained from the received speech can be referred to as inputted communication values. As used herein, communication values are values that are particular to received speech or a NLG output or response, such as those values that are the subject matter of the NLG output (e.g., the present temperature, the address and name of a user or store). Proper nouns, characteristics unique to a situation or user, and other dynamic information can be considered a communication value. For example, a user may ask "What is the weather in Royal Oak, Mich.?" The city name "Royal Oak" and the state name "Michigan" can be considered communication values, whereas the communication goal would be to receive weather information pertaining to inputted communication values (or Royal Oak, Mich.). The communication values may be recognized as being unique or dynamic information contained in received speech signals using a natural language understanding (NLU) system. At least in some embodiments, these communication values can be used as input into the neural network NLG template selection process, as discussed below in step 350. Additionally, as will be discussed more below, communication values can be obtained for insertion into input fields of an NLG template. These communication values that are obtained for insertion into input fields of a NLG template can be referred to as responsive communication values. The method 300 continues to step 340.

In step 340, it is determined whether an NLG output or response is to be generated. In some scenarios, an ASR system may receive speech signals and perform an operation, but may not need to generate and transmit an NLG output since, for example, the performance of the operation speaks for itself—i.e., performing the operation will result in indications that sufficiently convey to the user that the speech was interpreted accurately and/or resulted in the desired operation of the user. Whether or not a response is to be generated can be determined through analyzing the communication goal that was determined in step 330. However, some communication goals may require or be supplemented by an NLG output or response, such as those where the user queries the system using the speech signals and, based on the fact that the user asked a question using their voice, it may be determined that the results of the query should be or preferably communicated to the user using speech. Thus, if it is determined that an NLG output or response is to be generated, the method 300 continues to step 350; otherwise, the method 300 ends.

In step 350, a natural language generation (NLG) template for use in generating an NLG output is selected. In some embodiments, the NLG template is selected using a neural network NLG template selection process, wherein the neural network NLG template selection process uses an artificial neural network to resolve a set of inputs to select an NLG template for use in generating an NLG output. Before the neural network NLG template selection process is carried out, a set of inputs can be obtained that are to be used in the neural NLG template selection process. The set of inputs can include the communication goal, a user history that is associated with the user, or a user profile that is associated with the user.

According to one embodiment, the set of inputs includes a communication goal (e.g., the communication goal determined in step 330), communication values, information from a user's profile, and/or information from a user's history. Any one or more of these metrics can be determined at the time that step 350 is reached or may be determined at a prior time and saved in a memory located at the client device, such as memory 38 of wireless communications device 30. According to the latter scenario, upon step 350 being reached, one or more metrics that will be used in the set of inputs to the machine learning NLG process can be recalled from the memory device. In one embodiment, the user's history can include information identifying previous styles, dialects, or character information pertaining to previously use speech from the user. Additionally, based on received speech from a user or other settings configured by a user, a style profile associated with the user can be used as input into the neural network templates selection process.

Once all of the inputs for the neural network NLG template selection process are obtained, the neural network NLG template selection process can be carried out. In some embodiments, the neural network NLG template selection process can be used to: (i) determine whether to use a static NLG template or a dynamic NLG template; (ii) when it is determined that a static NLG template will be used, then selecting a static NLG template from a plurality of static NLG templates; and (iii) when it is determined that a static NLG template will be used, then generating a dynamic NLG template, which can be carried out using the NLG template generation process (step 360). Any or all of these steps can be carried out at the client device, such as vehicle 12. Or, any or all of these steps can be carried out at a remote server, such as those included at remote facility 80. In one embodiment, the client device can query an NLG template database located at remote facility 80 for predefined or static NLG templates that match a particular user's interaction style (e.g., formal, informal, verbose, direct and to the point). The NLG template database can be queried using the communication goal, the style of the user, the communication values from the received speech, and/or communication values that are to be used in the NLG output.

In many embodiments, a template is selected that matches the vocabulary, style, verbiage, and/or character of the user. When a predefined or static NLG template does not sufficiently match these attributes of the user, the template selection process may determine to generate and use a dynamic NLG template. The method 300 continues to step 360 if a dynamic NLG template is selected to be used; otherwise, if a predefined or static NLG template is to be used, the method 300 continues to step 370.

In step 360, when it is determined that a dynamic NLG template will be used for generating the NLG output, then the dynamic NLG template is generated. This can include generating an NLG template particularly for the communication goal and using a determined style that is to be used in the NLG output. In some embodiments, the set of inputs for the neural network NLG template selection process can be used for a neural network NLG template generation process that is used to generate the dynamic NLG template. The dynamic template can be based on a predefined or static NLG template that can be modified in light of the style or character of the user. For example, if the user is considered to be verbose and uses a particular type of dialect or verbiage, then the process can start with a verbose static NLG template. Thereafter, the verbose static NLG template can be modified in light of the user's particular style so as to generate a dynamic NLG template that better conforms the user's style. In other embodiments, a rule-based approach, and not a neural network approach, can be used to generate the dynamic templates. A rule-based approach can use a predefined set of rules regarding certain predefined templates, styles or emotions of speech, user history, user profiles, communication goals, and/or communication values. These rules can be followed so as to develop a dynamic NLG template. Once a dynamic NLG template is generated, the method 300 continues to step 370.

In step 370, an NLG output based on the selected NLG template is generated. The NLG output can be generated by using templated phrases or sentences from the selected NLG template and, then, inserting the communication values to be conveyed into certain designated input fields within the templated phrases and sentences. The communication values may be obtained and can be based on a style and/or emotion of the user. The communication values can be obtained based on sending a communication value request to a remote server that can process the request and return communication values. For example, the communication value request can include an indicator of a communication goal and communication values that were included in the received speech signals. A remote server can then be queried such that an appropriate response (i.e., a communication value response) is provided that satisfies the request or intent of the user as conveyed in the received speech signals. The communication value response can be received and used along with the selected NLG template to generate the NLG output. Once the NLG output is generated, the NLG output can be communicated to the user using, for example, speakers or another audio playback device, such as the audio system 54 of vehicle 12. In other embodiments, the NLG output may comprise text that is displayed on a screen, such as touchscreen 58 of vehicle 12.

As mentioned above, at least in some embodiments, the neural network NLG process and/or application (and the sub-processes) can adapt based on previous iterations. In one embodiment, the neural network NLG template selection process can adapt by retaining the set of inputs of a given iteration and the NLG output for the given iteration. Additionally, the client device can determine a measured success of the given iteration based on one or more performance indicators. The performance indicators can include the time taken to perform the speech recognition or machine learning NLG process, the accuracy of matching the style or emotion of the NLG output to the style or emotion of the received speech signals, and/or other indications of the accuracy and/or efficiency of the NLG template selection and/or generation processes. In some embodiments, any one or more of the set of inputs can be used as a performance indicators. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:

1. A method of generating a natural language generation (NLG) output, wherein the method comprises:
   receiving speech signals from a user at a microphone of a client device;
   determining a requested communication goal and at least one inputted communication value based on the received speech signals;
   determining to use a static natural language generation (NLG) template or a dynamic NLG template to generate an NLG output, wherein the determination of whether to use a static NLG template or a dynamic NLG template is made using a neural network NLG template selection process;
   selecting an NLG template after the determination of whether to use a static NLG template or a dynamic NLG template; and
   generating an NLG output based on the selected NLG template.

2. The method of claim 1, further comprising the step of identifying a user or a likely user that transmitted the speech signals.

3. The method of claim 2, wherein the neural network NLG template selection process is carried out based on a history of the identified user or likely user and/or a profile of the identified user or likely user.

4. The method of claim 3, wherein the selected NLG template is selected based on the history of the identified user or likely user and/or the profile of the identified user or likely user.

5. The method of claim 4, further comprising the step of identifying a style based on the received speech signals, the history of the identified user or likely user, and/or the profile of the identified user or likely user, and wherein the identified style is used in the neural network NLG template selection process.

6. The method of claim 1, further comprising the step of, when it is determined that a dynamic NLG template is to be used to generate the NLG output, then generating the dynamic NLG template using an NLG template generation process.

7. The method of claim 6, wherein the dynamic NLG template is generated based on the communication goal and one or more obtained communication values.

8. The method of claim 7, further comprising the step of identifying a user or a likely user that transmitted the speech signals, wherein the dynamic NLG template is generated based on user information that is associated with the user or likely user, and wherein the user information includes either or both of user history information or user profile information.

9. The method of claim 8, wherein the NLG template generation process is a rule-based NLG template generation process.

10. The method of claim 8, wherein the NLG template generation process is a neural network NLG template generation process.

11. The method of claim 1, further comprising the steps of:
    sending a communication value request to a remote server, wherein the communication value request is a request to obtain responsive communication values that are to be used in the NLG output and that are based on the communication goal and inputted communication values; and
    receiving a communication value response from the remote server, wherein the communication value response includes responsive communication values that are to be used in generating the NLG output.

12. The method of claim 1, further comprising the step of adapting the neural network NLG template selection process based on previous iterations of the neural network NLG template selection process.

13. The method of claim 12, wherein the adapting step further comprises adapting the neural network NLG template selection process based on a set of inputs, the NLG output, and a measured success of the neural network NLG template selection process, wherein the set of inputs includes the communication goal, the inputted communication values, and information pertaining to a user or a likely user that transmitted the speech signals.

14. A method of generating a natural language generation (NLG) output, wherein the method comprises:
    receiving speech signals from a user at a microphone of a client device;
    identifying a user or a likely user that transmitted the speech signals;
    determining a communication goal and at least one inputted communication value based on the received speech signals;
    determining whether to use a static NLG template or dynamic NLG template for use in generating an NLG output, wherein the determination of whether to use a static NLG template or dynamic NLG template is made using a neural network NLG template selection process, wherein the neural network NLG template selection process uses an artificial neural network to resolve a set of inputs to select whether to use a static NLG template or dynamic NLG template for use in generating an NLG output, and wherein the set of inputs include the communication goal, the inputted communication values, and either a user history that is associated with the user or a user profile that is associated with the user;
    where it is determined to use a static NLG template, then selecting a static NLG template;
    when it is determined to use a dynamic NLG template, then generating the dynamic NLG template; and
    generating the NLG output using the selected NLG template.

15. The method of claim 14, wherein the set of inputs includes both the user history that is associated with the user and the user profile that is associated with the user.

16. The method of claim 14, wherein the neural network NLG template selection process includes a set of potential outputs that include a first NLG template output value and a second NLG template output value, wherein the first NLG template output value corresponds to a probability that a static NLG template will be used in generating the NLG output, and wherein the second NLG template output value corresponds to a probability that a dynamic NLG template will be used in generating the NLG output.

17. The method of claim 14, wherein the identifying step includes using the received speech signals to identify the user and wherein it is determined to use a static NLG template or a dynamic NLG template based on an identified style, emotion, and/or dialect of the received speech signals.

18. The method of claim 17, wherein the dynamic NLG template is generated and/or the static NLG template is selected based on the identified style, emotion, and/or dialect of the received speech signals.

19. The method of claim 14, wherein the dynamic NLG template is generated using a machine learning NLG template generation process, and wherein the machine learning NLG template generation process uses a different machine learning technique than that which is used in the neural network NLG template selection process.

20. The method of claim 14, wherein the dynamic NLG template is generated using a rule-based approach that includes a predefined set of rules that are followed in generating the dynamic NLG template.

* * * * *